US006601960B2

(12) United States Patent
Richard

(10) Patent No.: US 6,601,960 B2
(45) Date of Patent: Aug. 5, 2003

(54) TRANSPARENT PLASTIC OR POLYMER BASED MIRROR AND METHOD FOR MAKING THE SAME

(75) Inventor: David A. Richard, Shingles, CA (US)

(73) Assignee: VTEC Technologies, Inc., Chestnut Hill, MA (US)

( * ) Notice: Subject to any disclaimer, the term of this patent is extended or adjusted under 35 U.S.C. 154(b) by 0 days.

(21) Appl. No.: 10/177,614

(22) Filed: Jun. 24, 2002

(65) Prior Publication Data

US 2003/0016458 A1 Jan. 23, 2003

Related U.S. Application Data

(63) Continuation-in-part of application No. 09/916,777, filed on Jul. 27, 2001, now Pat. No. 6,409,354.
(60) Provisional application No. 60/227,194, filed on Aug. 23, 2000.

(51) Int. Cl.[7] .............................................. G02B 7/182
(52) U.S. Cl. .................. 359/883; 359/884; 359/585; 359/586
(58) Field of Search ................................ 359/883, 884, 359/585, 586, 587, 588, 589, 870, 359, 360, 580, 584; 427/160; 428/610, 627, 629

(56) References Cited

U.S. PATENT DOCUMENTS

| | | |
|---|---|---|
| 3,879,625 A | 4/1975 | McVey et al. |
| 4,193,668 A | 3/1980 | Skinner |
| 4,385,804 A | 5/1983 | Tamura et al. |
| 4,666,264 A | 5/1987 | Yamabe |
| 4,944,581 A | 7/1990 | Ichikawa |
| 5,085,907 A | 2/1992 | Smith |
| 5,143,789 A | 9/1992 | Sanford et al. |
| 5,361,172 A | 11/1994 | Schissel et al. |
| 5,483,386 A | 1/1996 | Carson |
| 5,540,978 A | 7/1996 | Schrenk |
| 5,552,927 A | 9/1996 | Wheatley et al. |
| 5,646,780 A | 7/1997 | Crook et al. |
| 5,773,126 A | 6/1998 | Noritake et al. |
| 5,800,918 A | 9/1998 | Chartier |
| 5,991,591 A | 11/1999 | Chen et al. |
| 6,017,609 A | 1/2000 | Akamatsu et al. |
| 6,159,618 A | 12/2000 | Danroc et al. |
| 6,178,034 B1 | 1/2001 | Allemand et al. |
| 6,180,224 B1 | 1/2001 | Shouji et al. |
| 6,256,147 B1 | 7/2001 | Davis |

Primary Examiner—Mohammad Sikder

(57) ABSTRACT

A polymer-based mirror formed from a synthetic thermoplastic or thermoset resin substrate, such as polymethyl methacrylate, which is resistant to warping and distortion from moisture. A composite multi-layer surface-hardening coating is formed on at least the anterior surface of the resin substrate. The mirror further includes a composite multi-layer reflective coating. A protective back-coat layer is deposited on a posterior surface of the mirror. A multi-layer weather-resistant coating may optionally be applied to the anterior surface of the polymer-based mirror in order to increase the weatherability and durability of the mirror. The various layers coating the synthetic resin substrate have their moisture permeabilities selected so that substantially equal amounts of moisture permeate through to both the anterior and posterior side of the synthetic resin substrate.

29 Claims, 5 Drawing Sheets

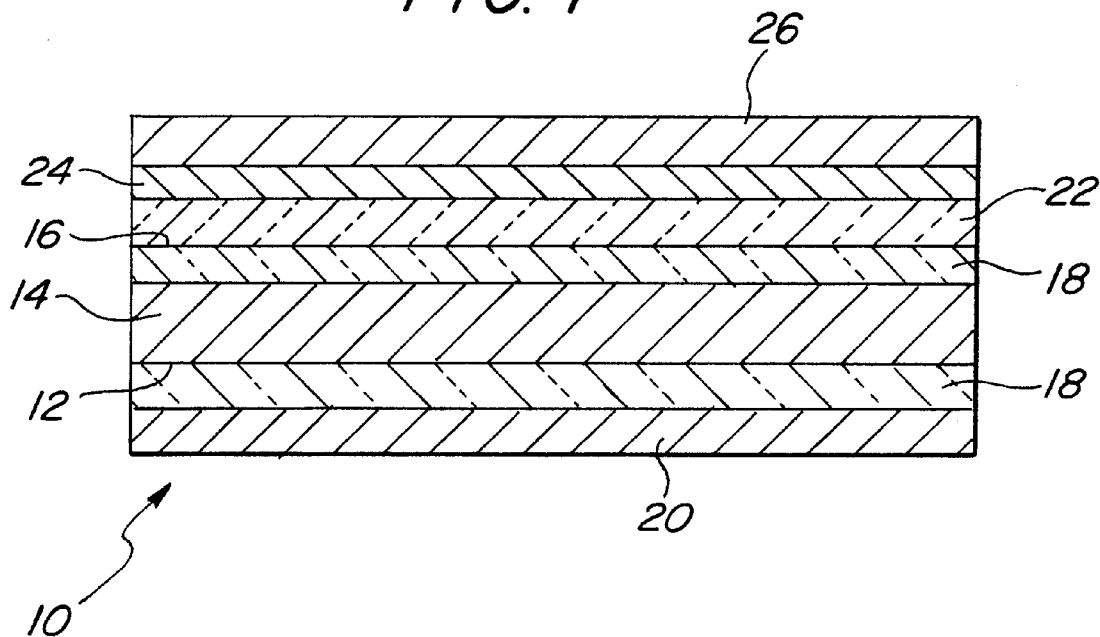
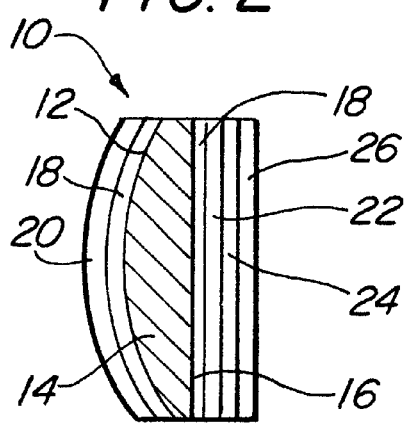 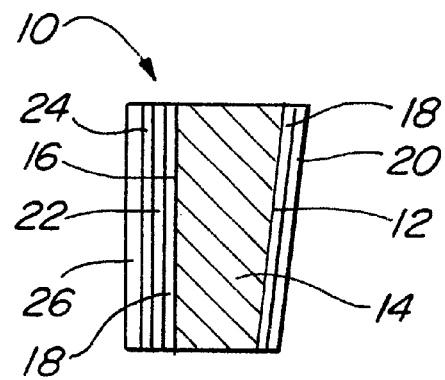

TRANSPARENT PLASTIC OR POLYMER BASED MIRROR AND METHOD FOR MAKING THE SAME

RELATED APPLICATIONS

This application is a continuation-in-part of U.S. patent application Ser. No. 09/916,777, filed Jul. 27, 2001, now issued as U.S. Pat. No. 6,409,354, which is a continuation of U.S. Provisional Patent Application Serial No. 60/227,194, filed Aug. 23, 2000.

BACKGROUND OF THE INVENTION

1. Field of the Invention

The present invention relates generally to plastic or polymer-based mirrors, and specifically to a lightweight and durable synthetic resin mirror resistant to warpage and a method for the manufacture thereof 2. Description of Related Art Mirrors typically have a multilaminate configuration. In particular, mirrors are typically formed by selectively depositing a series of compounds on a glass substrate material. These layers generally include a reflective layer and a protective back-coat layer covering the reflective layer. The reflective layer is commonly formed from a thin film of aluminum, chromium, rhodium, or silver. In industrial applications, aluminum is typically used in place of silver due to its high reflectivity and low cost. The protective back-coat layer serves a multiplicity of functions, such as protecting the reflective layer from humidity. This function is required as the reflective layer, especially if it is formed from aluminum, is easily corroded by moisture. Since the substrate material upon which the reflective layer is deposited is often permeable to moisture, it is important that the protective back-coat layer be substantially impermeable to moisture in order to provide an effective encasement for the reflective layer. The back-coat layer also serves as a mechanical barrier to, for example, impact damage from airborne particulate matter. A properly configured and applied back-coat layer thus assists to provide a durable mirror.

Due to the high production costs related to glass mirrors, significant research has been undertaken to develop a durable, low-cost plastic mirror employing a synthetic resin substrate material. Furthermore, due to the shatter-proof nature of synthetic resin mirrors, their use is preferred in automobiles over conventional glass mirrors in order to improve the safety of the automobile. The primary focus of this research has been in connection with dynamically stable and substantially optically clear thermoplastic or thermoset resins, such as polymethyl methacrylate (PMMA). As a result of these efforts, a method for sequentially depositing an aluminum reflective material and an impermeable back-coat layer on a resin substrate material has been developed.

The main problem associated with synthetic resin mirrors is their significantly limited operational service life resulting from warpage or distortion of the mirrors due to the hygroscopic properties of thermoplastics or thermoset resins. Unlike their glass counterparts, mirrors formed with a thermoplastic or a thermoset resin as their substrate material gradually absorb moisture from the surrounding atmosphere. Over time, the moisture so absorbed corrodes the reflective layer. Further, the absorption of moisture, coupled with variations in other climatic conditions, causes the thermoplastic or thermoset resin to expand and contract. Compounding these problems is the fact that the back-coat layer is, typically, not affected by humidity or other climatic conditions. The back-coat layer thus acts to prevent the smooth linear expansion and contraction of the thermoplastic or thermoset resin substrate. Furthermore, the moisture permeability of the various coatings applied to both sides of the synthetic resin substrate often lead to different amounts of moisture being absorbed by the opposing surfaces of the synthetic resin substrate, thus resulting in uneven expansion and contraction on both sides of the substrate. These conditions all interact to produce distortion to the image produced by the reflective layer of the plastic mirror and a related loss of optical clarity. As the mirror ages, this degradation only becomes more acute.

In order to reduce the susceptibility of synthetic resins to hygroscopic effects, it has been proposed that a hardening material be applied to the thermoplastic or thermoset resin substrate before deposition of the reflective layer. Currently organosilicon polymers are the preferred hardening material. These polymers are preferred due to their ability to provide protection against impact damage and their high optical clarity when fully cured. Although organosilicon polymers are the best available material for this purpose, these polymers are not totally impermeable to water. Thus, although partially effective, these polymers do not provide a complete remedy to all of those issues related to the use of a thermoplastic or thermoset resin substrate material in connection with a mirror apparatus.

A need exists for a mirror apparatus that does not suffer from the foregoing disadvantages and limitations. In particular, a need exists for a mirror apparatus formed using a thermoplastic or thermoset resin substrate that will remain substantially unaffected by ambient environmental conditions.

SUMMARY OF THE INVENTION

The foregoing shortcomings and disadvantages of the prior art are alleviated by the present invention that provides a polymer-based mirror that is resistant to mechanical distortion resulting from climatic and hydrodynamic conditions. The polymer-based mirror includes a substrate or transparent element formed from a synthetic thermoplastic or thermoset resin, such as polymethyl methacrylate or the like. The resin substrate has an anterior surface and a posterior surface. A tie-bond layer is typically applied to all of the exposed surfaces of the resin substrate.

Following deposition of the tie-bond layer, a surface-hardening layer is coated on at least the anterior surface of the resin substrate. This layer may consist of one or more layers of various materials which form a surface-hardening layer substantially impermeable to water. A surface-hardening layer formed of the following layers has been found to provide a desired level of moisture permeability for the anterior surface of the synthetic resin substrate: 500 to 1200 angstroms of SiO, preferably 750 angstrom; 300 to 1200 angstroms of $SiO_2$, preferably 550 angstrom; and, 600 to 1400 angstroms of $Z_x(iPv)_2$, preferably 725 angstrom. A surface-hardening layer may also be applied to the posterior surface of the synthetic resin substrate, where the posterior surface-hardening layer preferably comprises 300 to 1200 angstroms of $SiO_2$, preferably 550 angstrom; and, 600 to 1400 angstroms of $Z_x(iPv)_2$, preferably 725 angstrom.

A reflective layer of a composition substantially resistant to moisture is deposited on the posterior side of the resin element. The reflective layer comprises a series of materials sequentially deposited onto the posterior surface of the treated resin substrate. A reflective layer formed from the following layers exhibits the desired reflectance, moisture permeability, and durability for the polymer-based mirror of the present invention: 500 to 1200 angstroms of SiO, preferably 750 angstroms; 700 to 1500 angstroms of aluminum, preferably 1200 angstroms; 500 to 1200 angstroms of SiO, preferably 750 angstroms; 600 to 1400 angstroms of $Z_x(iPv)_2$, preferably 725 angstroms; and 300 to 1200 angstroms of $SiO_2$, preferably 550 angstroms. The reflective layer of the invention is preferably formed on the synthetic resin substrate via a vacuum deposition technique. A protective back-coat layer is then deposited over the reflective layer to encase the outer surface of the reflective film layer. When the surface-hardening layer is also applied to the posterior surface of the resin substrate, the back-coat layer can also encase the surface-hardening layer as well as the reflective layer. A weather-resistant coating is further applied to the anterior surface of the polymer-based mirror in order to increase the weatherability and durability of the mirror.

Overall, the polymer-based mirror of the present invention has a multilaminate configuration including sequentially deposited layers of organic and inorganic materials. The polymer-based mirror of the present invention exhibits superior moisture resistance as compared to conventional aluminum, chromium, and rhodium coated mirrors. The present invention further provides a mirror that is easily and economically produced.

BRIEF DESCRIPTION OF THE DRAWINGS

The features of the present invention, which are believed to be novel, are set forth with particularity in the appended claims. The present invention, both as to its organization and manner of operation, together with further advantages, may best be understood by reference to the following description, taken in connection with the accompanying drawings in which the reference numerals designate like parts throughout the figures thereof and wherein:

FIG. 1 is a cross-sectional view of a preferred embodiment of the polymer-based mirror of the present invention;

FIG. 2 is a cross-sectional view of another preferred embodiment of the polymer-based mirror of the present invention;

FIG. 3 is a cross-sectional view of yet another preferred embodiment of the polymer-based mirror of the present invention;

DETAILED DESCRIPTION OF THE PREFERRED EMBODIMENTS

Figure 4:
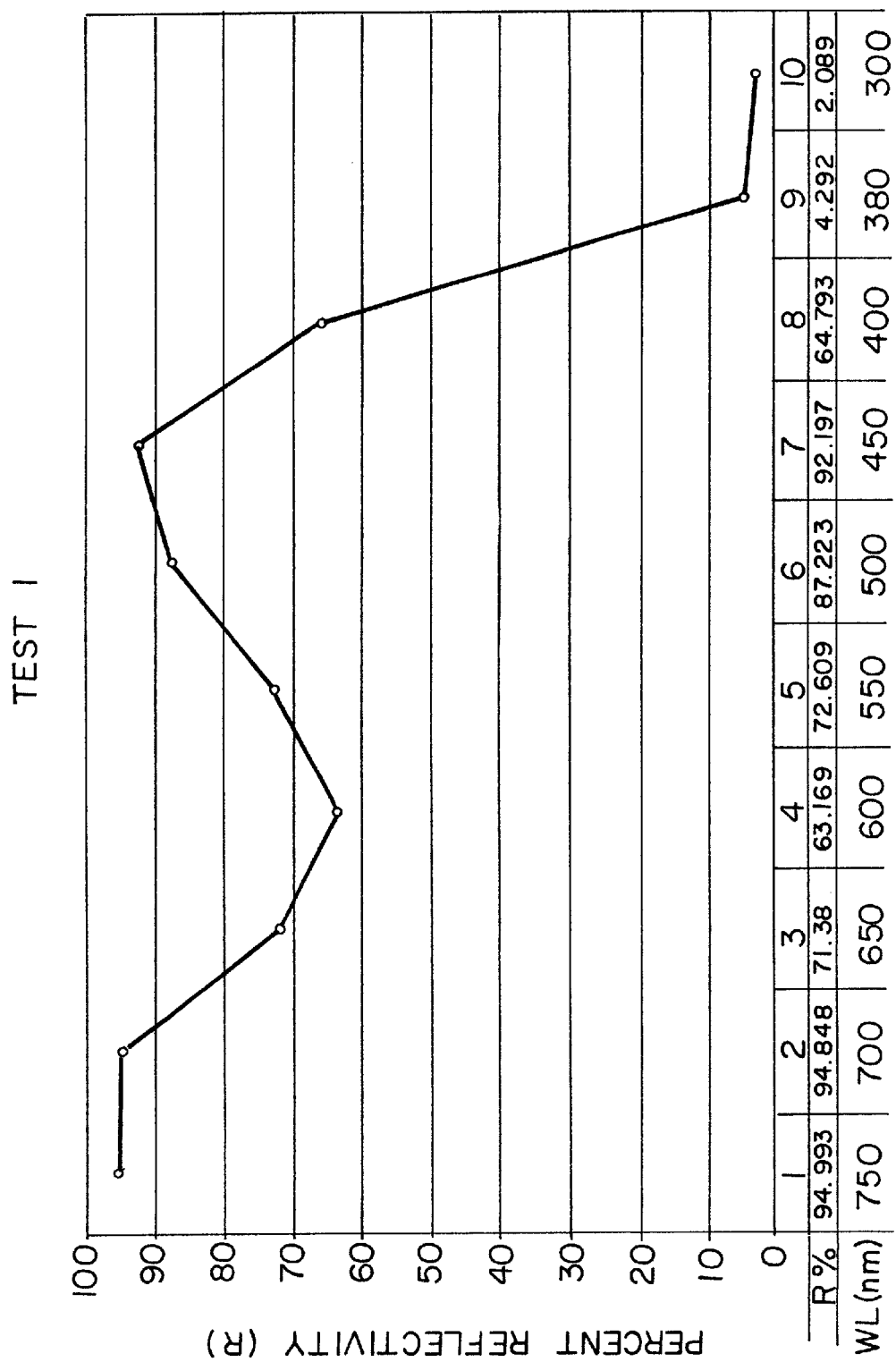
FIG. 4 is a graphical representation of the results of a reflectivity test of six mirrors made in accordance with the present invention having a first coating.

The following description is provided to enable any person skilled in the art to make and use the invention and sets forth the best modes contemplated by the inventors of carrying out their invention. Various modifications, however, will remain readily apparent to those skilled in the art, since the general principles of the present invention have been defined herein specifically to provide a polymer-based mirror.

The present invention is directed to a polymer-based mirror which may possess any variety of configurations. For example, as discussed with regard to the several FIGURES, the polymer-based mirror of the present invention can have a wedge-like, curved, toric, planar, or other configuration. The polymer-based mirror can be utilized as an interior or exterior rearview mirror for an automobile. However, it is understood that the polymer-based mirror of the present invention is not limited to automotive usage and may be utilized for other mirror applications as well.

The polymer-based mirror of the invention is comparable to a glass mirror in quality and appearance, but is advantageous over glass due to its lightweight and durable design. The polymer-based mirror of the present invention has been designed so as to not exhibit significant moisture absorption. As a result, the polymer-based mirror of the present invention does not exhibit noticeable warping or other mechanical distortion. In varied climatic conditions, the polymer-based mirror of the invention remains dynamically stable. The mirror of the invention is also very durable. The surface-hardening layers noted below impart significant resistance to mechanical damage from, for example, airborne particles. As a result, the mirror of the invention exhibits sufficient stability so as to comply with automobile industry test standards related to, for example, internally and externally mounted rearview mirrors.

Referring now to FIG. 1, a cross-sectional view of a preferred embodiment of the polymer-based mirror 10 designed as an inside rearview mirror for a vehicle is illustrated. A transparent mirror body 14 is typically made of a synthetic resin substrate high in optical clarity, such as a thermoplastic or thermoset resin. A preferable synthetic resin is polymethyl methacrylate (PMMA) resin, while it is understood that other similar polymers may also be utilized in forming the synthetic resin substrate 14, such as polycarbonate (bisphenol-A), cyclic olefins, styrene, acrylic/styrene, CR-39® manufactured by PPG Industries, acetate, polyvinyl butyrate, or polyurethane. This synthetic resin substrate 14 can readily be shaped by an injection or compression molding process.

The PMMA resin substrate 14 is preferably formed by polymerizing methyl methacrylate, where virtually all of the methyl methacrylate reacts during the polymerization reaction to form PMMA. Some unreacted monomers do remain on a front surface 12 and a rear surface 16 of the resin substrate 14 as well as within the core of the resin substrate 14. Those monomers within the resin substrate 14 typically blush to the closest of either the front surface 12 or rear surface 16 following the molding process. In order to eliminate any detrimental effects which these monomers may cause, all of the exposed surfaces of the resin substrate 14 are treated with a thin and transparent surface preparation in the form of an organic silicon material. This action renders the resin substrate 14 virtually chemically inert.

This organic silicon material is sprayed, dipped, or centrifugally coated onto the resin substrate 14 to form a tie-bond layer 18 on the front surface 12 and the rear surface 16 of the resin substrate 14. The tie-bond layer 18 is preferably an organosilicon polymer with a thickness of between about 3 and about 10 microns. The tie-bond layer 18 also serves to provide the substrate with a sufficient degree of scratch resistively. A typical organosilicone is one prepared from triethoxymethyl silane $CH_3Si(OC_2H_5)_3$. The tie-bond layer 18 is, generally, permeable to humidity, for example, the rate of moisture absorption through the organosilicon silane is about 3 g/m² per 24 hours when tested in an atmosphere maintained at 500° C. with 98% room humidity. Thus, the tie-bond layer 18 requires an additional coating to reduce this permeability.

Following application of the tie-bond layer 18, the front (anterior) surface 12 of the resin substrate 14 is coated with a surface-hardening layer 20. The surface-hardening layer 20 may consist of one or more layers of various materials which form a surface-hardening layer substantially impermeable to water. A surface-hardening layer 20 formed of the following layers has been found to provide a desired level of hardness and moisture permeability for the synthetic resin substrate: 500 to 1200 angstroms of SiO, preferably 750 angstrom; 300 to 1200 angstroms of $SiO_2$, preferably 550 angstrom; and, 600 to 1400 angstroms of $Z_x(iPv)_2$, preferably 725 angstrom. If desired, the rear (posterior) surface 16 can also be coated with a surface-hardening layer 22 without detracting from the performance of a subsequent reflective layer 24 and protective back-coat layer 26 applied to the posterior surface 16. A surface-hardening layer 22 formed of the following layers has been found to provide a desired level of hardness and moisture permeability for the synthetic resin substrate: 300 to 1200 angstroms of $SiO_2$, preferably 550 angstrom; and, 600 to 1400 angstroms of $Z_x(iPv)_2$, preferably 725 angstrom.

To provide a mirror surface, the posterior surface 16, or posterior surface-hardening layer 22 (if applied), of the resin substrate body 14 is further coated with a thin composite reflective layer 24. The reflective layer 24 is applied using vacuum deposition techniques. The reflective layer 24 is formed by sequentially depositing a series of organic and inorganic materials. A reflective layer 24 having the following sequential layers has been found to provide the desired moisture permeability, level of reflectivity, durability, and resistance to corrosion: 500 to 1200 angstroms of SiO, preferably 750 angstrom; 700 to 1500 angstroms of aluminum, preferably 1200 angstrom; 500 to 1200 angstroms of SiO, preferably 750 angstrom; 600 to 1400 angstroms of $Z_x(iPv)_2$, preferably 725 angstrom; and, 300 to 1200 angstroms of $SiO_2$, preferably 550 angstrom. The reflective layer 24 having this construction has been found to provide good reflectivity and excellent resistance to erosion from the influence of moisture. Furthermore, this alloy for the reflective layer 24 is superior to the reflectivity of a standard aluminum thin film reflective coatings. The reflective layer 24 possesses a luminous transmission of approximately 94.5%.

As a mechanical protection for the thin reflective layer 24, a protective back-coat layer 26 is formed so as to closely cover the entire area of the outer major surface of the reflective layer 24. Various known materials and coating methods can be used to form, and apply, the back-coat layer 26. For example, a back-coat layer 26 of excellent properties can be obtained by applying a resin based paint containing a relatively large amount of a powered inorganic filler material such as calcium carbonate, barium carbonate and/or aluminum silicate. As a particular example of this type of coating method, it is possible to form a back-coat layer 26 sufficiently high in physical strength and appropriate in reduced humidity permeability by the application of a paint which comprises an alkyd resin binder and a calcium carbonate powder (between about 1 to about 5 microns in particle size) amounting to 75 to 80% by weight of the alkyd resin so as to afford a thickness of between about 10 to about 20 microns to the resultant back-coat layer 26. The presence of the back-coat layer 26 further eliminates the need to include the SiO layer, which is present in the anterior surface-hardening layer 20, in the posterior surface-hardening layer 22. As a primary feature of the invention, the permeability of the back-coat layer 26 to moisture is selected to operate in conjunction with the moisture permeability of the underlying layers, i.e., reflective layer 24 and posterior surface-hardening layer 22, and the anterior surface-hardening layer 20 so as to ensure that substantially equal amounts of moisture permeate through to both the anterior surface 12 and the posterior surface 16 of the resin substrate 14. There is no need to extend the protective back-coat layer 26 so as to cover the edge faces 28 and 30 of the reflective layer 24, resulting in allowing the back-coat 26 to be formed and applied with high productivity and in a highly-efficient manner.

The polymer-based mirror illustrated in FIG. 1 has a generally laterally elongated rectangular shape as well as generally rectangular cross-sectional shape. In other preferred embodiments of the present invention, the resin body 14 may be formed as other than rectangular. For example, as shown in FIG. 2, a polymer-based mirror 200 having a plano-convex resin substrate 202 is shown. In FIG. 3, a polymer-based mirror 300 having wedge-shaped resin substrate 302 is shown, where the anterior surface 12 and the posterior surface 16 are not parallel to each other. The resin substrate 302 is so shaped as to be wedge-like in cross-section in order to avoid glare from the mirror 300 during night running of a vehicle employing the mirror 300. In FIGS. 2 and 3, like reference numbers refer to like elements described in connection with FIG. 1 and further discussion of these like elements will be omitted. It is also possible for the polymer-based mirror to have other shapes and configurations, including but not limited to toric, bi-convex, plano-concave, and bi-concave.

From a practical viewpoint, the polymer-based mirror of the present invention is comparable to a conventional mirror created by a glass plate coated with an aluminum film owing to the high transparency of the optically clear thermoplastic or thermoset resin substrate 14 and good reflectivity of the reflective SiO—Al—SiO—$Z_x(iPv)_2$—$SiO_2$ reflective layer 24. Moreover, the polymer-based mirror 10 is advantageous in its lightweight nature and durability of the resin substrate 14. Furthermore, the possibility of shaping the cross-sectional resin substrate 14 by a simple injection or compression molding without the need of any machining operations leads to reduction of the total cost of production compared with the production conventional glass mirror of the same shape.

As one of the most remarkable effects of the invention, the polymer-based mirror 10 of the present invention 10 is quite stable and can withstand extended use in either dry or humid atmospheres. The polymer-based mirror 10 has an anterior treated surface and a posterior treated surface that exhibit substantially equivalent reduced moisture permeability to prevent warpage or distortion of the mirror 10. The reason for the substantially equivalent reduced moisture permeability is that the composition and thicknesses of the anterior surface-hardening layer 20, posterior surface-hardening layer 22, reflective layer 24, and back-coat layer 26 are selected to have a moisture permeability providing the anterior surface 12 of the resin substrate 14 with substantially the same exposure to moisture as the posterior surface 16. The resin substrate 14 absorbs low levels of moisture from its anterior surface 12 and undergoes only slight swelling in the region contiguous to the anterior surface 12 as a result. At the same time, the same atmospheric moisture condition is applying itself to the posterior surface 16 of the resin substrate 14. The moisture permeability conditions of the posterior surface-hardening layer 22, reflective layer 24, and back-coat layer 26 are selected such that the resin substrate 14 absorbs the same minimum levels of moisture from the posterior surface 16 as its anterior surface 12 and tends to undergo only slight swelling on the posterior side of the resin substrate 14 as well. For this reason, even when the resin substrate 14 swells by absorption of moisture, the swelling occurs on both anterior surface 12 and posterior surface 16 in an almost balanced manner. Therefore, the swelling of the resin substrate 14 does not result in distortion of the optical surface figure of the mirror to a degree that it degrades the optical performance of the mirror 10.

Experiments on the polymer-based mirror 10 formed in accordance with the present invention were performed to determine the advantageous characteristics and effects of the thin film formula ranges described within the invention on mirror reflectivity performance. In these experiments, the surface-hardening layers 20 and 22 and the organosilicon silane tie-bond layer 18 were not altered, where the composition of the reflective layer 24 was altered to illustrate its effect on reflectivity of the mirror 10.

Experiment Number One

Six (6) sample mirrors of the present invention were subjected to the test. All samples were subjected to film deposition. The reflective coating 24 deposited was: 500 Angstrom of SiO, 700 Angstrom of Al, 500 Angstrom of SiO, 600 Angstrom of $Z_x(iPv)_2$, and 300 Angstrom of $SiO_2$. An adequate background of $O_2$ gas was introduced for reaction of the coating media. Evaporation was performed at $5\times10^{-5}$ TORR. This pressure has been found to allow reactive evaporation and is low enough to produce dense coatings. Upon completion of the coating process, the mirrors were subjected to reflectivity testing and aesthetic observation. The outcome of the reflectivity test was:

| Wavelength | % reflectivity | Color |
|---|---|---|
| 750 | 94.993 | dark blue |
| 700 | 94.948 | dark blue |
| 650 | 71.360 | dark blue |
| 600 | 63.169 | dark blue |
| 550 | 72.609 | dark blue |
| 500 | 87.223 | dark blue |
| 450 | 92.197 | dark blue |
| 400 | 64.793 | dark blue |
| 380 | 4.292 | dark blue |
| 300 | 2.089 | dark blue |

A graphical representation of the results of the foregoing reflectivity test is shown in FIG. 4.

Experiment Number Two

Six (6) sample mirrors of the present invention were subjected to the test. All samples were subjected to film deposition. The reflective coating 24 deposited was: 750 Angstrom of SiO, 1200 Angstrom of Al, 750 Angstrom of SiO, 725 angstrom of $Z_x(iPv)_2$, and 500 Angstrom of $SiO_2$. An adequate background of $O_2$ gas was introduced for reaction of the coating media. Evaporation was performed at $5\times10^{-5}$ TORR. This pressure has been found to allow reactive evaporation and is low enough to produce dense coatings. Upon completion of the coating process, the mirrors were subjected to reflectivity testing and aesthetic observation. The outcome of the reflectivity test was:

| Wavelength | % reflectivity | Color |
|---|---|---|
| 750 | 95.220 | silver |
| 700 | 95.131 | silver |
| 650 | 95.133 | silver |
| 600 | 94.959 | silver |
| 550 | 94.339 | silver |
| 500 | 95.220 | silver |
| 450 | 95.025 | silver |
| 400 | 95.503 | silver |
| 380 | 5.146 | silver |
| 300 | 4.399 | silver |

Figure 5:
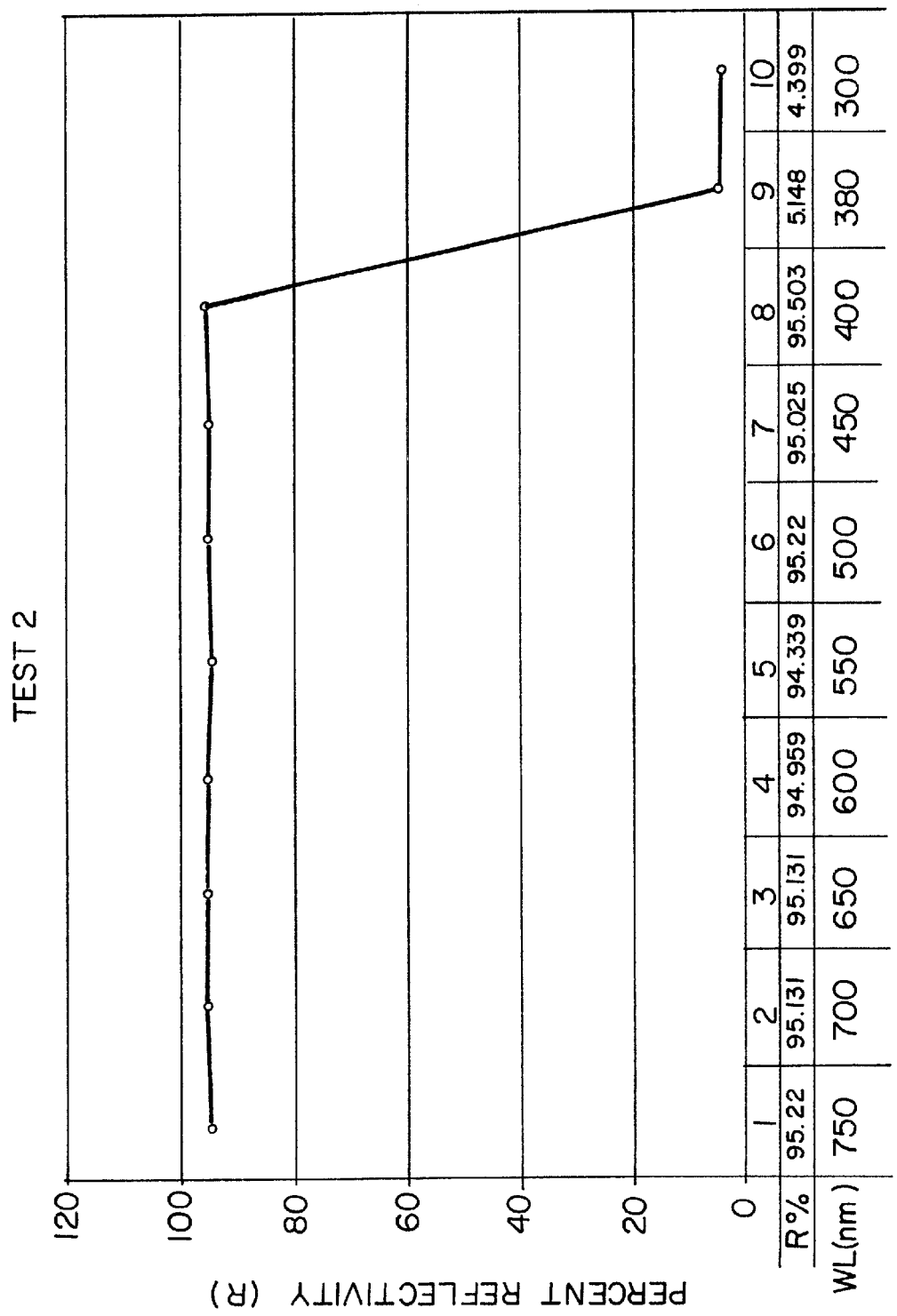
FIG. 5 is a graphical representation of the results of a reflectivity test of six mirrors made in accordance with the present invention having a second coating.

A graphical representation of the results of the foregoing reflectivity test is shown in FIG. 5.

Experiment Number Three

Six (6) sample mirrors of the present invention were subjected to the test. All samples were subjected to film deposition. The reflective coating 24 deposited was: The coating description was: 1200 Angstrom of SiO, 1500 Angstrom of Al, 1200 Angstrom of $Z_x(iPv)_2$, and 1200 Angstrom of $SiO_2$ An adequate background of $O_2$ gas was introduced for reaction of the coating media. Evaporation was performed at $5\times10^{-5}$ TORR. This pressure has been found to allow reactive evaporation and is low enough to produce dense coatings. Upon completion of the coating process, the mirrors were subjected to reflectivity testing and aesthetic observation. The outcome of the reflectivity test was:

| Wavelength | % reflectivity | Color |
|---|---|---|
| 750 | 95.306 | gold |
| 700 | 95.054 | gold |
| 650 | 95.259 | gold |
| 600 | 94.998 | gold |
| 550 | 95.434 | gold |
| 500 | 95.139 | gold |
| 450 | 95.139 | gold |
| 400 | 94.653 | gold |
| 380 | 12.153 | gold |
| 300 | 7.589 | gold |

Figure 6:
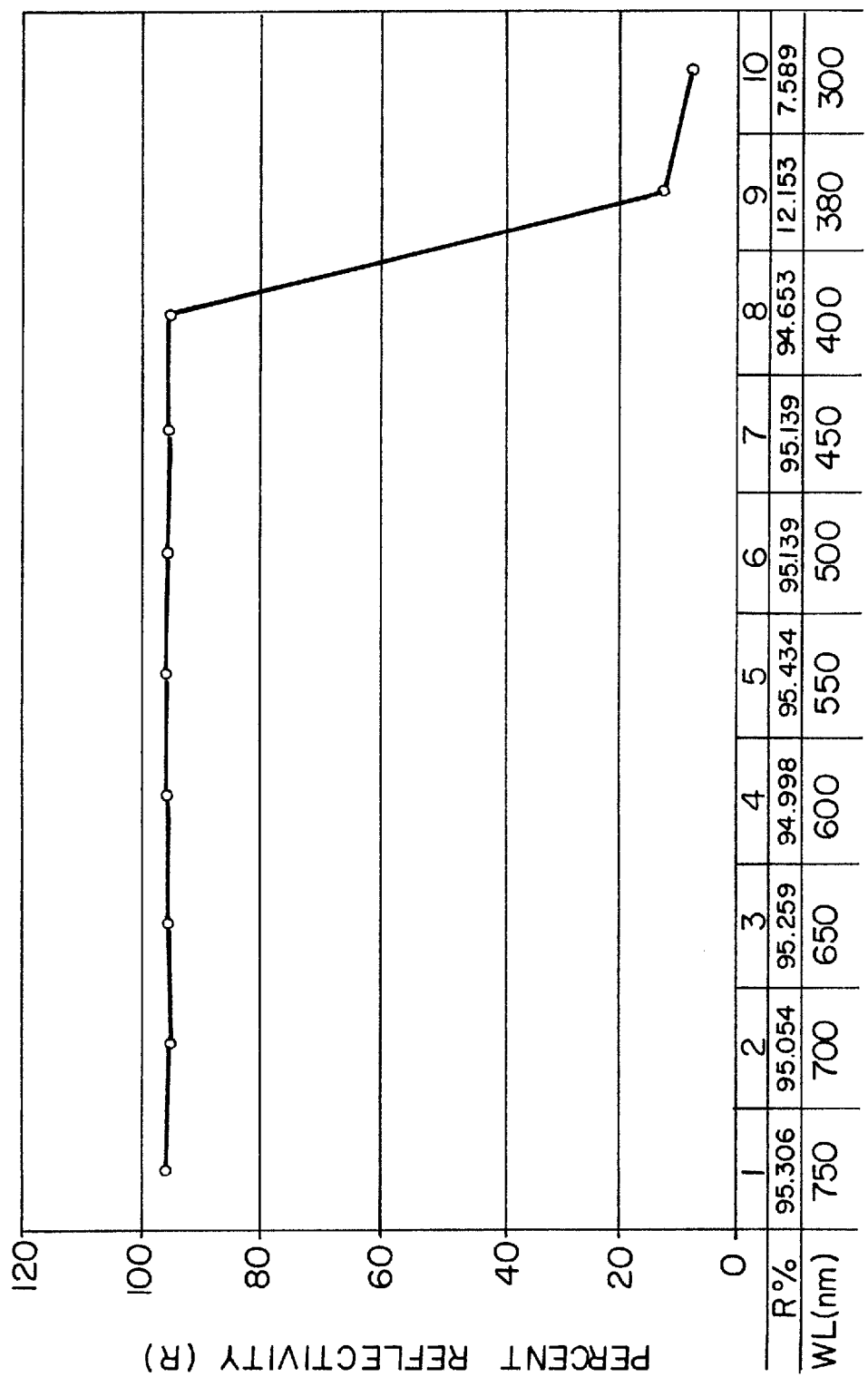
FIG. 6 is a graphical representation of the results of a reflectivity test of six mirrors made in accordance with the present invention having a third coating.

A graphical representation of the results of the foregoing reflectivity test is shown in FIG. 6.

Experiment Number Four

An experiment was carried out to determine the resistance and stability of the polymer-based mirror formed in accordance with the present invention when exposed to a high moisture and salt environment according to the ASTM B 117-95 standard. Each reflective film was fabricated according to the description presented. There were three (3) mirrors subjected to the test. Two (2) of the mirrors of the present invention samples were of an aspheric anterior surface figure and one (1) was of a piano anterior surface figure. All three samples of the invention were subjected to a concentrated salt solution of 5+/−1% water with sodium chloride. The specific gravity of the condensate was 1.036. The pH of the condensate was 6.8. The volume of the concentrate was 1.3 ml/hr/80 $cm^2$. The test chamber temperature was 35+/−1° C. The invention specimens were positioned at an incline to the spray of 15° from the vertical. All invention samples were exposed to the test for 96 hours of continuous spray. None of the samples of the invention were subjected to any pre-cleaning. After the conclusion of the test, the sample mirrors were water rinsed and air-dried. Observations at the conclusion of the test were that there were no visual or mechanical defects on any of the three (3) sample mirrors. Additionally, an examination of the reflectivity concluded that there had been no deterioration of the pre-test reflectivity results. Additionally, examination of the optical imagery of the sample mirrors showed no post-test distortion.

The mirror of the invention also includes modification of the anterior surface geometry so as to both increase the viewing angle of the device and allow for the correction of image aberrations. By incorporating aspheric formulae such as:

$$z(x) = \frac{cx^2}{1 + \sqrt{1 - c^2(k+1)x^2}} + a_1 x^4 + a_2 x^6 + a_3 x^8 + a_4^1$$

where: c, k, $a_n$=spherical, conic, and aspheric coefficients
x=distance (radius) from the center of the lens
z=depth or as NERBS in a CAD/CAM design the mirror of the invention can be given an anterior configuration configured to correct magnification errors and distortions typically observed in glass interior and exterior rearview mirrors.

Figure 7:
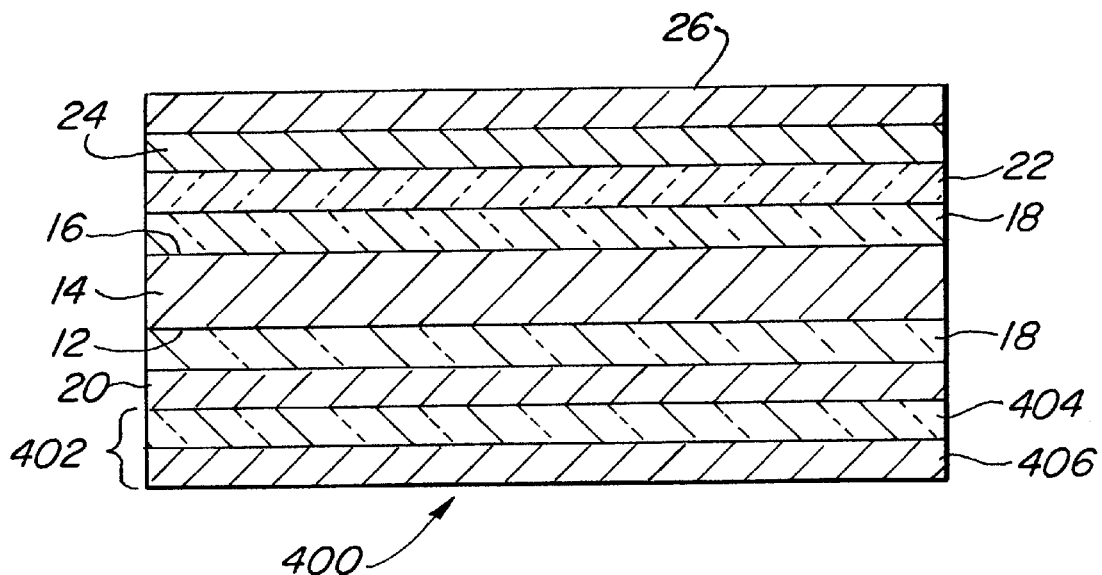
FIG. 7 is a cross-sectional view of another preferred embodiment of the polymer-based mirror of the present invention.

Referring now to FIG. 7, a cross-sectional view of a polymer-based mirror 400 formed in accordance with another preferred embodiment of the present invention is illustrated in which the polymer-based mirror 10 described in FIG. 1 further includes a weather-resistant coating 402 on the anterior side of the mirror 400. The elements of FIG. 7 which are similarly numbered as those elements in FIG. 1 are equivalent, and a further description of these elements already described in connection with FIG. 1 will be omitted from the description of the polymer-based mirror 400 of FIG. 7. The elements of the polymer-based mirror 400 which are similarly numbered as those elements are The weather-resistant coating 402 includes a hydrophilic stack of layers 404 having its outer surface covered with a hydrophobic layer 406, where the hydrophilic stack 404 is formed over the anterior surface-hardening layer 20. The hydrophilic stack 404 preferably comprises alternating layers of zirconia ($ZrO_2$) and silicon dioxide, where a stack 404 of the following construction has been found by the inventors to provide optimal levels of reflectivity and transmission while maintaining an absence of color in the stack 404: 2616 angstrom of $SiO_2$, 246 angstrom of $ZrO_2$, 174 angstrom of $SiO_2$, 765 angstrom of $ZrO_2$, 907 angstrom of $SiO_2$. The hydrophobic layer 406 is preferably a hydrophobic acting perfluoroalkylsilane which forms a strongly adherent fluorised siloxane coating on the outer surface of the hydrophilic stack 404. The optimal coating thickness for the perfluoroalkylsilane layer 406 is approximately 5–20 nm.

By utilizing alternating layers of $SiO_2$ and $ZrO_2$ in the hydrophilic stack 404 in combination with the hydrophobic perfluoroalkylsilane layer 406, a weather-resistant coating 402 is provided which increases the weatherability and durability of the mirror 400 by affording a more weather resistant barrier to water infusion. The layers of the hydrophilic stack 404 and the hydrophobic layer 406 are both dry coatings which are vacuum coated onto the surface of the anterior surface-hardening layer 20. By utilizing a dry coating technique, a more uniform, flawless coating 402 can be achieved than is possible through wet coating techniques.

Wet coatings are not ductile and tend to craze, resulting in fissures forming in the coatings where moisture can penetrate. By forming the weather-resistant coating 402 through a dry coating technique, the likelihood of these fissures forming is reduced significantly. Furthermore, the compositions of the hydrophilic stack 404 and the hydrophobic layer 406 are selected to have matching thermal coefficients of expansion, so that the various layers within the weather-resistant coating 402 expand and contract in a substantially uniform manner under all conditions to which the mirror 400 is exposed. The thermal coefficient of expansion of the weather-resistant coating 402 is further matched against the other layers of the polymer-based mirror 400, so that all of the various layers expand and contract in a substantially uniform manner. By matching the thermal coefficients of expansion of the various layers, the bonds formed between the layers will also be maintained in a more secure manner to prevent the leakage of moisture there through. The above-described stack composition of the weather-resistant coating 402 has been found to provide the optimal balance between warpage, reflectivity, and weatherability of the polymer-based mirror 400.

Figure 8:
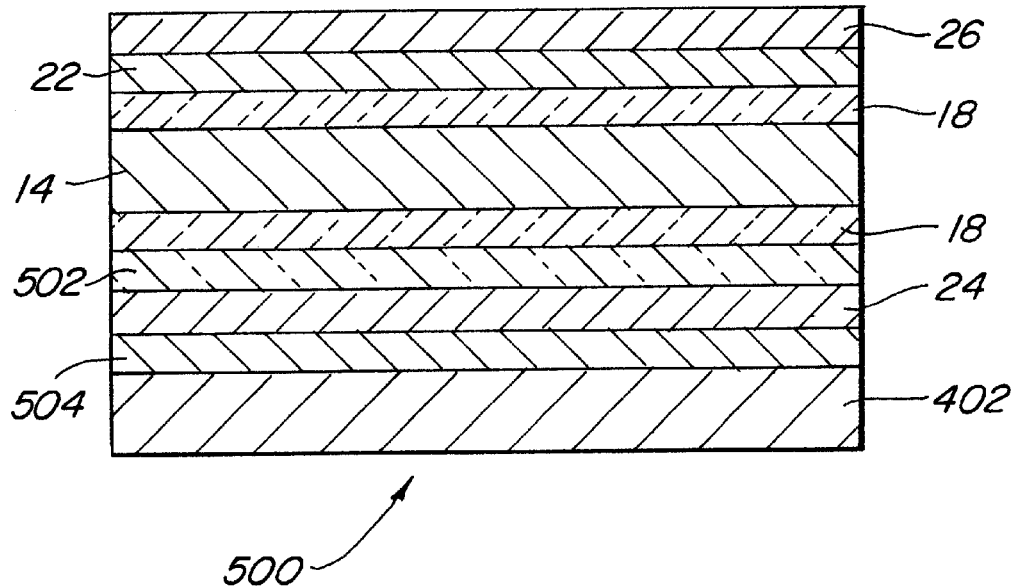
FIG. 8 is a cross-sectional view of another preferred embodiment of the polymer-based mirror of the present invention.

Referring now to FIG. 8, a cross-sectional view of a polymer-based mirror 500 formed in accordance with an alternative embodiment of the present invention is illustrated in which the reflective layer 24 is positioned on the anterior side of the resin substrate 14. The elements of FIG. 8 which are similarly numbered as those elements in FIG. 1 are equivalent, and a further description of the composition of these elements already described in connection with FIG. 1 will be omitted from the description of the polymer-based mirror 500 of FIG. 8. The core of the polymer-based mirror comprises a resin substrate 14 having tie-bond layers 18 respectively formed on its front surface 12 and its rear surface 16. The posterior surface-hardening layer 22 and back-coat layer 26 would then be respectively formed over the tie-bond layer 18 on the posterior side of the resin substrate 14. Prior to forming the reflective layer 24 on the anterior side of the resin substrate, a layer of SiO material 502 between 500 to 1200 angstroms, preferably 750 angstrom, is formed over the tie-bond layer 18. The reflective layer 24 is then formed over the SiO layer 502. An anterior surface-hardening layer 504 is then formed to coat the reflective layer, where the anterior surface-hardening layer 504 has the same composition as posterior surface-hardening layer 22. The weather-resistant coating 402 is then formed over the anterior surface-hardening layer 504. In this embodiment of the polymer-based mirror 500, the reflective surface of the mirror 500 is located on the anterior side of the resin substrate 14 so that light is reflected from the mirror without actually passing through the resin substrate 14. However, the polymer-based mirror may still be subjected to the same warpage and distortion problems from moisture as the other embodiments of the present invention. Thus, each of the various layers of polymer-based mirror 500 are also selected to have a moisture permeability providing the anterior surface 12 of the resin substrate 14 with substantially the same exposure to moisture as the posterior surface 16.

While it is understood that polymer-based mirror of the present invention may be formed in any number of ways known to shape thermoplastic or thermoset resin objects, the resin substrate 14 in the various embodiments of the polymer-based mirror of the present invention is preferably formed using an improved injection/compression molding technique. Once the resin substrate 14 has been formed using this technique, it is removed from the mold where the various coatings of the present invention are then applied to form the polymer-based mirror. The injection/compression molding process of the preferred invention consists of enjoining a compression action within an injection mold (not shown) with the activity of a conventional injection molding process. The injection/compression molding process can be described as a cyclical process which encompasses the following steps: heating and melting of a thermoplastic resin material; mixing and homogenizing the now liquid material (the melt); injecting the melted thermoplastic material into the mold cavity; initiating the injection/compression cycle of the present invention; cooling and curing or solidifying the melted thermoplastic resin in the mold cavity, and ejecting the finished resin substrate 14 from the mold. The injection/compression molding process requires that the thermoplastic material undergo two phase changes during the cycle. The solid thermoplastic resin is first heated to form a viscous liquid melt for injection into the mold after which the melt is converted back into a solid state by cooling in the mold under secondary compression.

In selecting PMMA as the preferred optical grade material for the present invention, it is understood that all plastics are governed by the thermodynamic principles which are basic to the chemical structure of each. In the melting of various thermoplastics, the quantity of heat required per unit weight may vary significantly depending on the differences in heat capacity of the various thermoplastics. This characteristic also defines the control the process and mold design have over molecular orientation in the processing of plastic mirrors.

The present invention overcomes the problems of poor mold surface replication and residual part stresses by the molded thermoplastic article, and more specifically to maximize micro-replication of the finest surface detail and figure onto an optical grade thermoplastic injection molded product such as a plastic mirror. Such fidelity of the injection molded part to the molding surfaces is achieved by dynamically moving, under hydraulic pressure, the surfaces of the mold toward one another during a particular phase of the injection cycle. As the injection portion of the molding cycle is underway, at a predetermined point of change over from a first stage of injection, the pre-determined, volumetrically metered filling of the mold cavity is stopped and the injection cycle goes into a second stage holding time phase. Synchronous with the point of first stage to second stage cycle phase change over, the mold starts to compress the contents of its cavity simultaneously with cessation of the injection of thermoplastic material. Prior to the thermoplastic material temperature declining below its glass transition temperature, the mold has compressed the cavity contents to a pre-adjusted position. Uniform compression is exerted over the entire surface of the resin substrate 14. As a result of the uniform compression, all stresses are distributed uniformly over the entire area of the parts surface, significantly negating stress induced birefringence. Furthermore, the process also creates a processing environment that renders uniformity to part-to-part density thus controlling the parts optical clarity and weight.

The injection/compression technique of the present invention incorporates unique characteristics that differ considerably from that of conventional injection mold techniques. While conventional injection mold techniques utilize stationary molds the use of injection packing pressures to complete the fill cycle of the thermoplastic material injection process, the present invention incorporates dynamic components that allow for the reduction of injection pressures during the molding process while integrating exceptional control over the part volume and the ability to molecularly replicate the resin substrate surfaces.

In another preferred embodiment of the present invention, an annealing procedure may be added to the formation of the polymer-based mirror 10 to further enhance its compliance with weatherability requirements for both interior and exterior vehicular applications. The annealing process is done to release internal stress within the synthetic resin substrate 14. The annealing process consists of heating the polymer-based mirror 10 (in an oven for example) to about 130° to 150° F for about 5–6 hours. The piece is then cooled slowly to room temperature, 70° F., and must at least be cooled to 110° F. In performing the annealing process, forced-air circulation ovens designed for the annealing and heating of synthetic polymers are recommended. Good forced air circulation ensures uniform temperatures essential to the annealing process. The oven's air velocity should be between 150–250 feet per minute and should be controllable to within +/−10° F. (+/−6° C.) to avoid uneven or excessive heating. Temperature control selection effects oven performance. Controllers monitoring oven temperature and maintaining constant voltage into the heating elements are considered to work best, but conventional controllers can be used, such as percentage timer controls which regulate the percent of time heaters are on, but may not provide the best uniform heat the better controllers offer for this process. Proportional time controls with step switches to vary heat output have shown to produce uneven temperatures when evaluated under this process.

Before the annealing process begins, the polymer-based mirror must be clean and dry. Spray masking, protective tape, paper masking, and other material must be removed to prevent it from baking onto the material. Plastic masking may remain in place. To anneal synthetic polymers, heat to 180° F. (80° C.), just below the deflection temperature, and cool slowly. Heat one hour per millimeter of thickness. For thin sheet, a minimum of two hours has been found to be preferable. While cooling times are generally shorter than heating times, thermal stresses may occur if cooled too quickly. A minimum cooling time of two hours should be used.

Experiments showed that for thicknesses above 8 mm, the hours required to cool equal the thickness in millimeters divided by four. It is important that the items are not removed until the oven temperature falls below 140° F. (60° C.). Removing the mirror too soon can offset annealing's positive effects. It is important to ensure that the mirror is adequately supported during annealing. Raised sections may need independent support to prevent sagging. Lack of proper support can also inhibit relaxation.

| Thickness (in.) | Heating Time (min.) | Cooling Time (hours) | Cooling Time (hours) | (° F./hr.) |
| --- | --- | --- | --- | --- |
| .080 | 2.0 | 2 | 2 | 28 |
| .098 | 2.5 | 2 | 2 | 28 |
| .118 | 3.0 | 3 | 2 | 28 |

The character of the mirror substrate 14 can be further enhanced through the application of light path and reflectivity enhancing organic or inorganic coatings or additives. Such coatings or additives may be applied through a variety of methods, such as but not limited to dipping, spraying, vacuum deposition and/or compounding into the synthetic substrate. Such coatings and/or additives may be utilized to enhance the weatherability of the mirror assembly through the application of anti-abrasion and anti-reflective surface coatings and/or through the addition of Hindered Amine Light Stabilizers (HALS), Antioxidants, Quenchers, and Ultraviolet absorbers or inhibitors to the substrate material.

The synthetic substrate 14 further may be UV (ultraviolet) stabilized with a UV inhibitor or UV absorber in order to prevent color or synthetic substrate degradation over time as well as enhancing the light energy absorbing characteristics of the synthetic substrate. UV absorbers work by absorbing ultraviolet radiation and converting it into thermal energy through tautomerism. To counteract the damaging effect of UV light and improve the weatherability of the synthetic substrate 14, UV stabilizers may be used to solve the degradation problems associated with exposure to sunlight. UV stabilizers can be categorized by two general classifications for an ultraviolet light absorber (UVA), either benzopheneone or benzotriazole based systems. The preferred substrate 14 additives for the present invention being the type based on benzotriazole and hindered amine light stabilizers (HALS).

Typical UV inhibitors or stabilizers which may be utilized in the present invention are: Cyagard® 1164L, Cyagard® 3638, Cyagard® UV 531, Cyagard® UV 5411, Cyagard® UV 9, Cyasorb® 1084, Cyasorb® 1164, Cyasorb® 284, Cyasorb® UV 1988, Cyasorb® UV 2098, Cyasorb® UV 2126, Cyasorb® UV 24, Cyasorb® UV 2908, Eastman Inhibitor RMB, Givsorb® UV-1, Givsorb® UV-2, Givsorb® UV-13, Givsorb® UV-14, Givsorb® UV-15, Givsorb® UV-16, Mark 1535, Mark 446, Maxgard® 200, Maxgard® 800, Norbloc® 6000, Norbloc® 7966, Quercetin, Sanduvor® 3206, Sanduvor® EPU, Sanduvor® VSU, Seesorb 201, Syntase 1200, THPE BZT, Tinuvin® 99, Tinuvin® 109, Tinuvin® 1130, Tinuvin® 120, Tinuvin® 1545, Tinuvin® 1577FF, Tinuvin® 320, Tinuvin® 326, Tinuvin® 327, Tinuvin® 328, Tinuvin® 384, Tinuvin® 400, Tinuvin® 571, Tinuvin® 840, Tinuvin® 900, Tinuvin® 928, Tinuvin® P, Uvinul® 3035, Uvinul® 3039, Uvinul® 3048, Uvinul® 400, Uvinul® D 49, Uvinul® D 50, Uvinul® P 25, Uvinul® T-150.

The addition of UV absorbers alone to a substrate often have limited effectiveness because their performance is a function of Beer's (Lambert) law, which specifies that the amount of UV radiation absorbed is a function of both sample thickness and stabilizer concentration. This means that UV absorbers need to be used in high concentrations and require relatively long path lengths in order to absorb enough UV light to be effective. Thus, the protection of the substrate 14 of the present invention is enhanced with a HALS (Hindered Amine Light Stabilizer), where the present invention preferably utilizes a combination of CIBA Chemicals Tinuvin® P and Tinuvin® 770 to provide the aforementioned UV light stabilization.

HALS are extremely efficient stabilizers against light-induced degradation of most polymers. They do not absorb UV radiation, but act to inhibit degradation of the polymer. Significant levels of stabilization are achieved at relatively low concentrations. HALS' high efficiency and longevity are due to a cyclic process wherein the HALS are regenerated rather than consumed during the stabilization process. HALS additives found to perform well with the UV inhibitor/absorber constituents chosen for the present invention are: CHIMASSORB® 119FL, CHIMASSORB® 2020, CHIMASSORB® 944, TINUVIN® 123, TINUVIN® 123S, TINUVIN® 622, TINUVIN® 765, TINUVIN® 770, TINUVIN® 783, AND TINUVIN® 791, all manufactured by CIBA Specialty Chemicals, Inc. The preferred HALS additive, TINUVIN 770 is a low molecular weight hindered amine light stabilizer that provides excellent stability for thick section synthetic polymer substrates. The range of the TINUVIN 770 additive concentration used in the present invention is from approximately 0.1% to 0.5% by weight, with a preferred amount of approximately 0.2%.

It is further possible to add a certain amount of dyes or tint color to the substrate 14 in order to enhance the optical performance of the mirror without reducing its reflectance below the acceptable standards of the international automotive industries. Several tints have been found to increase the contrast ratio of the image viewed through or from the mirror of the present invention, where these tints fall primarily in the spectrum range of 320 to 700 nm wavelengths. The tint colors being blue, red, green and yellow. Although the red, green and yellow tints helped to reduce the glare of the present invention, the rate of reduction was most dramatic through the introduction of a blue tint. The tints added to the substrate were generally found to only absorb about ⅓ of the visible light spectrum, while allowing the residual ⅔ to be reflected back.

In the automotive industry, the glare from light reflected back from automotive mirrors to a viewer is commonly known as the dazzle effect. This dazzle effect results from the reflected blue light, and not the remaining green, yellow, red and infrared light rays. Infrared light is for the most part removed by the water particles found in Earth's lower atmosphere. With the exception of blue light, the other colors have long wavelengths which pass through the atmosphere without being scattered and diffused. Conversely, the short wavelength blue light is diffused very rapidly. These blue light rays are then chaotically bounced around by water particles in the upper strata and lower down, continue to be thrown in all directions by any reflective surface on the ground so as to radiate in any and all directions. As these blue light rays enter the eye, they result in a haze effect, thus bleaching out the other colors and creating the effect known as glare. The tendency of blue light to scatter creates the effect of competing with all the other colors of the spectrum, thus causing the image that forms on the retina at the back of the eye to suffer from a certain amount of "bleaching" or glare.

Blue light is a higher energy light. By reducing or filtering it through absorption, we first allow all the remaining colors of the spectrum to show through more clearly and vividly as the blue light is no longer there to dominate. Secondly, the visual acuity (sharpness of vision) is enhanced by reducing the bleaching effect which causes the outline of objects to be hazed and indistinct. And, thirdly, there is a quantum improvement in the individuals' comfort by way of reduced light sensitivity.

The preferred blue tint additive for the substrate 14 for both cosmetic and light absorption reasons was found to be NIBIOLA Ultra Marine Blue, a sodium aluminum sulfosilicate. The typical chemical analysis of a medium Ultra Marine Blue gives us: SiO2 . . . 37%, Al2O3 . . . 28%, S . . . 14%, and Na2O . . . 19%. The NIBIOLA Ultra Marine Blue chemical formula can be expressed as: $Na_{6.88}$ $(Al_{5.65}Si_{6.35})$ $O_{24}S_{4.24}$. While the best results were observed from the use of NIBIOLA Ultra Marine Blue, it is understood that other blue tint additives could similarly be utilized. For example, the following blue tint additives were found to be compatible with the synthetic polymer base material comprising the substrate 14 of the present invention: heliogen pigments made by BASF, which are phthalocyanines, KRONOS 2073, Ti-Pure R-103 by Dupont, Tronox Chloride 470 and 435 as well as Tronox Sulfate R-KB-2 and CR-840. These blue tint additives performed well in reducing glare and dazzle in the reflective image from the mirror of the present invention. It is the full intention of the inventor of the present invention not to limit the tint additives to the above-described blue tint additives, where it is understood that any color tint additive could be utilized without departing from the teachings of the present invention.

The synthetic resin substrate 14 making up the base of the mirror of the present invention is a polymer, where most polymers are manufactured by processes involving chain polymerization, polyaddition, or polycondensation reactions. These processes are generally controlled to produce individual polymer molecules with the following defined variables: molecular weight (or molecular weight distribution), degree of branching, and composition. Once the initial product of these processes is exposed to further shear stress, heat, light, air, water, radiation or mechanical loading, chemical reactions start in the polymer which have the net result of changing the chemical composition and the molecular weight of the polymer.

These reactions, in turn, lead to a change in the physical and optical properties of the polymer. In practice, any change of the polymer properties relative to the initial, desirable properties is called degradation. In this sense, "degradation" is a generic term for any number of reactions which are possible in a polymer. The important aspect of this scheme is that once oxidation starts, which it always will, it sets off a circular chain reaction which accelerates degradation unless stabilizers are used to interrupt the oxidation cycle. Exposure to sunlight and some artificial lights can have adverse effects on the useful life of plastic products. UV radiation can break down the chemical bonds in a polymer. This process is called photodegradation and ultimately causes cracking, chalking, color changes and the loss of physical properties.

For the present invention to possess such image clarifying characteristics is was required to overcome several obstacles associated with synthetic polymers in general. By combining the aforementioned constituency of ultraviolet absorbers, antioxidants, quenchers, and hindered amine light stabilizers and compatible tint chromospheres, the polymer mirror of the present invention has been able to maintain the transmissivity and stability, of the mirror device as well as to maintain its compatibility with the aforementioned coatings.

It has been found that the combined use of a HALS component clearly improves the performance of a PMMA substrate's resistance to environmental degradation and the UV inhibitor additive augments the resistance to chemical bond breakdown. While any combination of a HALS component and a UV inhibitor could be utilized with the present invention, the preferred combination has been found to be that of Tinuvin® P with Tinuvin® 770 to provide the desired UV light stabilization.

The performance of the synthetic resin substrate 14 of the present invention was tested using variances of the aforementioned additives. The additives addressed were HALS, antioxidants, thermal stabilizers, and UV absorbers. These tests evaluated stabilizer performance and the effect of combined enhancement additives on overall performance of the substrate 14. The preferred combination of tints and resins were compared with a wide range of individual stabilizers. It has been found that lifetime effects of single stabilizers ranged from 0.03 to 6.1 times the lifetime of unaltered, unstabilized synthetic substrates for the various resins of the present invention that were tested. The known top performing single stabilizers were combined to optimize the UV and anti-oxidation stabilization concentrations and combinations of each of the single UV stabilizers and anti-oxidants. Each of the single UV stabilizers and anti-oxidants loadings were varied in the synthetic resin raw materials used to manufacture the substrate 14 test plaques.

The stability of each test plaque variant was observed. The process was repeated as necessary to optimize the relationship between the individual additive components.

The tint additive, UV absorber, and anti-oxidant concentrations were held constant, while concentrations of HALS and thermal stabilizers were optimized at different quencher concentrations. All other processing variables were held to within a processing window of plus or minus 5% by weight of the best recommended process window as derived from proprietary molding test protocols. In the present invention, it was observed that as the quencher light stabilizers were varied, the concentrations of HALS and thermal stabilizers required to achieve the maximum substrate service life also changed.

The results of the combined optimizations within the described new invention greatly expands the expected lifetime of the present inventions synthetic polymer based mirror substrates when compared to substrates not treated with the preferred additives described herein. In an evaluation of the stability of the described preferred tint additive, Ultramarine blue dye from NIBIOLA, the preferred tint of the present invention, lasted three times longer with accompanying additives than normal untreated synthetic substrates. The blue tint additive, KRONOS 2073 lasted more than 2.5 times longer in the substrate 14 of present invention with accompanying additives than normal untreated synthetic substrates. For example, the visual observations shown in the following chart illustrate that, after 24 hours, ULTRAMARINE Blue dye from NIBIOLA exhibited the following matrix interaction effects and reflectivity.

| Resin | Reflectivity | Color | Stability (2000 Hrs) accelerated testing |
| --- | --- | --- | --- |
| PMMA (Acrylic) | 72% | Cobalt Blue | Excellent |
| Polycarbonate | 56% | Intense Royal Blue | Good |
| CR-39 | 70% | Dark Blue | Excellent |

The present invention solves the difficult task of stabilizing synthetic resins having optical characteristics from the effects of weathering and ultra-violet radiation. The required stabilization is complicated by the multiple interactive effects observed between the available stabilizers, tint dyes, and synthetic resins. However, the additives to the resin substrate 14 of the present invention have been found to extend the expected lifetime of the substrate 14 over that of non-stabilized synthetic resins by a factor of 20.

As can be seen from the foregoing, a polymer-based mirror formed in accordance with the present invention provides a lightweight and durable synthetic resin mirror that is resistant to mechanical distortion resulting from moisture absorption. Further, the polymer-based mirror of the present invention possesses increased weatherability and durability by providing a more weather resistant barrier to water infusion.

In each of the above embodiments, the different structures of the polymer-based mirror are described separately in each of the embodiments. However, it is the full intention of the inventors of the present invention that the separate aspects of each embodiment described herein may be combined with the other embodiments described herein. Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A polymer-based mirror, comprising:
   a transparent synthetic resin substrate having an anterior surface and a posterior surface;
   a tie-bond layer formed on said anterior surface and said posterior surface of said synthetic resin substrate;
   a multi-layer surface-hardening coating formed adjacent to said tie-bond layer on said anterior surface of said synthetic resin substrate;
   a multi-layer reflective coating formed adjacent to one of said tie-bond layer on said posterior surface of said synthetic resin substrate and said surface-hardening coating;
   a protective back-coat layer formed as an outer posterior surface of said mirror;
   a multi-layer hydrophilic coating formed adjacent to an outer surface of surface-hardening coating, wherein at least one layer of said multi-layer hydrophilic coating includes zirconia; and
   a hydrophobic coating formed over an outer surface of said hydrophilic coating.

2. The polymer-based mirror of claim 1, wherein said tie-bond layer, said surface-hardening coating, said reflective coating, said back-coat layer, and said abrasion resistant coating, said hydrophilic coating, and said hydrophobic coating possess respective moisture permeability characteristics which allow substantially equal amounts of moisture to permeate through to said anterior and posterior surfaces of said synthetic resin substrate.

3. The polymer-based mirror of claim 1, wherein said surface-hardening coating comprises a SiO layer having a thickness between 500 to 1200 angstroms, a $SiO_2$ layer having a thickness between 300 to 1200 angstroms, and a $Z_x(iPv)_2$ layer having a thickness between 600 to 1400 angstroms.

4. The polymer-based mirror of claim 3, wherein said surface-hardening coating comprises a SiO layer of approximately 750 angstrom, a $SiO_2$ layer of approximately 550 angstrom, and a $Z_x(iPv)_2$ layer of approximately 725 angstrom.

5. The polymer-based mirror of claim 1, wherein said reflective coating comprises a multilayer film of sequentially deposited layers of SiO, Al, SiO, $Z_x(iPv)_2$, and $SiO_2$.

6. The polymer-based mirror of claim 5, wherein said reflective coating sequentially comprises a SiO layer having a thickness between 500 to 1200 angstroms, an Al layer having a thickness between 700 to 1500 angstroms, an SiO layer having a thickness between 500 to 1200 angstroms, a $Z_x(iPv)_2$ layer having a thickness between 600 to 1400 angstroms, and a $SiO_2$ layer having a thickness between 300 to 1200 angstroms.

7. The polymer-based mirror of claim 6, wherein said reflective coating sequentially comprises a SiO layer of approximately 750 angstrom, an Al layer of approximately 1200 angstrom, an SiO layer of approximately 750 angstrom, a $Z_x(iPv)_2$ layer of approximately 725 angstrom, and a $SiO_2$ layer of approximately 550 angstrom.

8. The polymer-based mirror of claim 1, further comprising a posterior surface-hardening layer formed on said posterior side of said synthetic resin substrate.

9. The polymer-based mirror of claim 8, wherein said posterior surface-hardening layer comprises a multi-layer coating with at least one of its layers including zirconia.

10. The polymer-based mirror of claim 9, wherein said posterior surface-hardening film comprises sequential layers of $SiO_2$, and $Z_x(iPv)_2$.

11. The polymer-based mirror of claim 10, wherein said posterior surface-hardening film comprises a $SiO_2$ layer having a thickness between 300 to 1200 angstroms and a $Z_x(iPv)_2$ layer having a thickness between 600 to 1400 angstroms.

12. The polymer-based mirror of claim 11, wherein said posterior surface-hardening film comprises a $SiO_2$ layer having a thickness of approximately 550 angstrom and a $Z_x(iPv)_2$ layer having a thickness of approximately 725 angstrom.

13. The polymer-based mirror of claim 1, wherein said synthetic resin substrate comprises transparent thermoplastic or thermoset resin.

14. The polymer-based mirror of claim 13, wherein said synthetic resin substrate comprises one of a polymethyl methacrylate (PMMA) material, a transparent crystalline polymer, and a cyclic olefin copolymer.

15. The polymer-based mirror of claim 1, wherein said multi-layer hydrophilic coating comprises alternative layers of silicon dioxide and zirconia.

16. The polymer-based mirror of claim 15, wherein said hydrophobic coating comprises perfluoroalkylsilane.

17. The polymer-based mirror of claim 16, wherein said perfluoroalkylsilane hydrophobic coating has a thickness of approximately 5–20 nm.

18. The polymer-based mirror of claim 17, wherein said multi-layer hydrophilic coating sequentially comprises from its outer surface toward its inner surface: a silicon dioxide layer of approximately 907 angstrom, a zirconia layer of approximately 765 angstrom, a silicon dioxide layer of approximately 174 angstrom, a zirconia layer of approximately 246 angstrom, and a silicon dioxide layer of approximately 2616 angstrom.

19. The polymer-based mirror of claim 1, wherein said hydrophobic coating and said multi-layer hydrophilic coating are both dry coatings which are vacuum coated onto the abrasion resistant coating.

20. The polymer-based mirror of claim 1, wherein said hydrophobic coating and said multi-layer hydrophilic coating have substantially equal thermal coefficients of expansion.

21. The polymer-based mirror of claim 1, wherein said hydrophobic coating and said multi-layer hydrophilic coating are dry coatings which are vacuum coated onto the abrasion resistant coating.

22. The polymer-based mirror of claim 1, wherein said hydrophobic coating, said multi-layer hydrophilic coating, said surface-hardening coating, said reflective coating, and said protective back-coat layer are dry coatings which are vacuum coated onto said resin substrate.

23. The polymer-based mirror of claim 1, wherein said synthetic resin substrate is formed by a combined injection molding and compression molding process.

24. The polymer-based mirror of claim 1, wherein said synthetic resin substrate is UV (ultra-violet) stabilized against the effects of UV light.

25. The polymer-based mirror of claim 24, wherein said synthetic resin substrate is UV stabilized through the addition of an UV absorber to said synthetic resin substrate.

26. The polymer-based mirror of claim 25, wherein UV absorber is a benzotriazole UV light absorber.

27. The polymer-based mirror of claim 24, wherein said synthetic resin substrate includes a hindered amine light stabilizer (HALS) to inhibit degradation of said synthetic resin substrate.

28. The polymer-based mirror of claim 1, wherein said synthetic resin substrate is tinted.

29. The polymer-based mirror of claim 28, wherein said synthetic resin substrate is tinted blue to reduce glare to a viewer of said polymer-based mirror.

* * * * *